United States Patent [19]

Beard

[11] Patent Number: 5,275,722
[45] Date of Patent: Jan. 4, 1994

[54] OXIDATION DITCH WASTEWATER TREATMENT AND DENITRIFICATION SYSTEM

[76] Inventor: Harold J. Beard, 1111 Colonial Dr., Baton Rouge, La. 70806

[21] Appl. No.: 841,596

[22] Filed: Feb. 25, 1992

[51] Int. Cl.$^5$ .............................................. C02F 3/30
[52] U.S. Cl. ............................ 210/195.1; 210/202; 210/253; 210/903; 210/906
[58] Field of Search .............. 210/194, 195.1, 195.3, 210/202, 253, 256, 258, 903, 926, 629

[56] References Cited

U.S. PATENT DOCUMENTS

| | | | |
|---|---|---|---|
| 3,485,750 | 12/1969 | Albertson | 210/926 |
| 4,290,884 | 9/1981 | Mandt | 210/903 |
| 4,383,922 | 5/1983 | Beard | 210/926 |
| 4,798,673 | 1/1989 | Huntington | 210/926 |
| 4,975,197 | 12/1990 | Wittmann et al. | 210/926 |

OTHER PUBLICATIONS

Principles and Practice of Nutrient Removal from Municipal Wastewater, The Soap and Detergent Association.

Primary Examiner—Christopher Upton
Attorney, Agent, or Firm—Robert C. Tucker; William David Kiesel; C. Dean Domingue

[57] ABSTRACT

An oxidation ditch wastewater treatment and denitrification system is provided, comprising an oxidation ditch, including a central channel, having an inlet end, an outlet end, a bottom and two sidewalls; an aeration channel, having an inlet end fluidly connected to the outlet end of the central channel, an outlet end fluidly connected to the inlet end of the central channel, a bottom and two sidewalls; and a denitrification channel, having an inlet end fluidly connected to the outlet end of the central channel, an outlet end fluidly connected to the inlet end of the central channel, a bottom and two sidewalls; an aerator, positioned in the aeration channel; and at least one circulation device, positioned in the oxidation ditch and adapted to circulate wastewater from the inlet end of the central channel to the outlet end of the central channel, from the inlet end of the aeration channel to the outlet end of the aeration channel, and from the inlet end of the denitrification channel to the outlet end of the denitrification channel.

11 Claims, 4 Drawing Sheets

OXIDATION DITCH WASTEWATER TREATMENT AND DENITRIFICATION SYSTEM

BACKGROUND OF THE INVENTION

1. Field of the Invention

This invention relates generally to oxidation ditch wastewater treatment systems and, more particularly, to oxidation ditch wastewater treatment systems which address denitrification of wastewater.

2. Prior Art

Due to the desire to more completely treat wastewater before discharging it back into the ecosystem, an increasing emphasis has been placed on the removal of primary aquatic nutrients, phosphorus and nitrogen, during the wastewater treatment process. Because of increased concerns over nitrogen compounds released in wastewater treatment plant effluent, governmental nitrification requirements are being implemented more broadly than phosphorus removal.

In an oxidation ditch activated sludge wastewater treatment; system, wastewater is circulated around a continuous oxidation ditch, with air being added at some point in the ditch in order to encourage microorganisms to aerobically decompose the waste in the wastewater. The circulating aerated wastewater is known as mixed liquor. Typically, aeration is provided by devices such as vertical turbines, brush rotors, or air diffusors, which are positioned at a convenient point in the ditch. During aerobic decomposition the microorganisms utilize oxygen in the decomposition of the waste. Very little biological activity takes place with regard to nitrogen compounds during aerobic decomposition. However, as the mixed liquor moves away from the aeration device and oxygen is depleted by the microorganisms, an anoxic zone develops in a small portion of the mixed liquor in the ditch just prior to the point of aeration. If the influent to the system enters at the upstream limit of the anoxic zone, some of the wastewater carbon source is used for denitrification in the anoxic zone, with the microorganisms feeding on the nitrogen compounds in lieu of the absent oxygen compounds.

The limit of the anoxic zone is a function of the dissolved oxygen in the ditch, which varies according to the characteristics of the influent and the amount of aeration provided. Because of this variance, as well as the fact that the activated sludge process must typically strive to achieve a high dissolved oxygen content, the single anoxic zone is unable to achieve adequate nitrogen removal. Further, if intrachannel clarification is employed in the oxidation ditch, the anoxic zone can be in the area of the ditch used for intrachannel clarification. Denitrification can then occur within the intrachannel clarifier, with the released nitrogen gas causing sludge to float within the clarifier. Thus, external nitrogen removal systems are used in conjunction with the oxidation ditch. These external systems, such as batch reactor systems, require equipment, land and tank capacity external to the ditch as well as additional energy to establish flow between the oxidation ditch and the nitrogen removal system.

SUMMARY OF THE INVENTION

Thus, it is an object of this invention to provide increased nitrogen removal within an oxidation ditch activated sludge system.

It is another object of this invention to provide an oxidation ditch wastewater treatment and denitrification system which occupies substantially the same amount of land as an oxidation ditch system of the same capacity without nitrogen removal capability.

It is still another object of this invention to provide an oxidation ditch wastewater treatment and denitrification system which is compatible with the use of an intrachannel clarifier.

It is a further object of this invention to provide an oxidation ditch wastewater treatment and denitrification system which accomplishes various combinations of the above objects.

Accordingly, an oxidation ditch wastewater treatment and denitrification system is provided, comprising an oxidation ditch, including a central channel, having an inlet end, an outlet end, a bottom and two sidewalls; an aeration channel, having an inlet end fluidly connected to the outlet end of the central channel, an outlet end fluidly connected to the inlet end of the central channel, a bottom and two sidewalls; and a denitrification channel, having an inlet end fluidly connected to the outlet end of the central channel, an outlet end fluidly connected to the inlet end of the central channel, a bottom and two sidewalls; an aerator, positioned in the aeration channel; and at least one circulation device, positioned in the oxidation ditch and adapted to circulate wastewater from the inlet end of the central channel to the outlet end of the central channel, from the inlet end of the aeration channel to the outlet end of the aeration channel, and from the inlet end of the denitrification channel to the outlet end of the denitrification channel.

DETAILED DESCRIPTION OF PREFERRED EMBODIMENTS OF THE INVENTION

Figure 1:
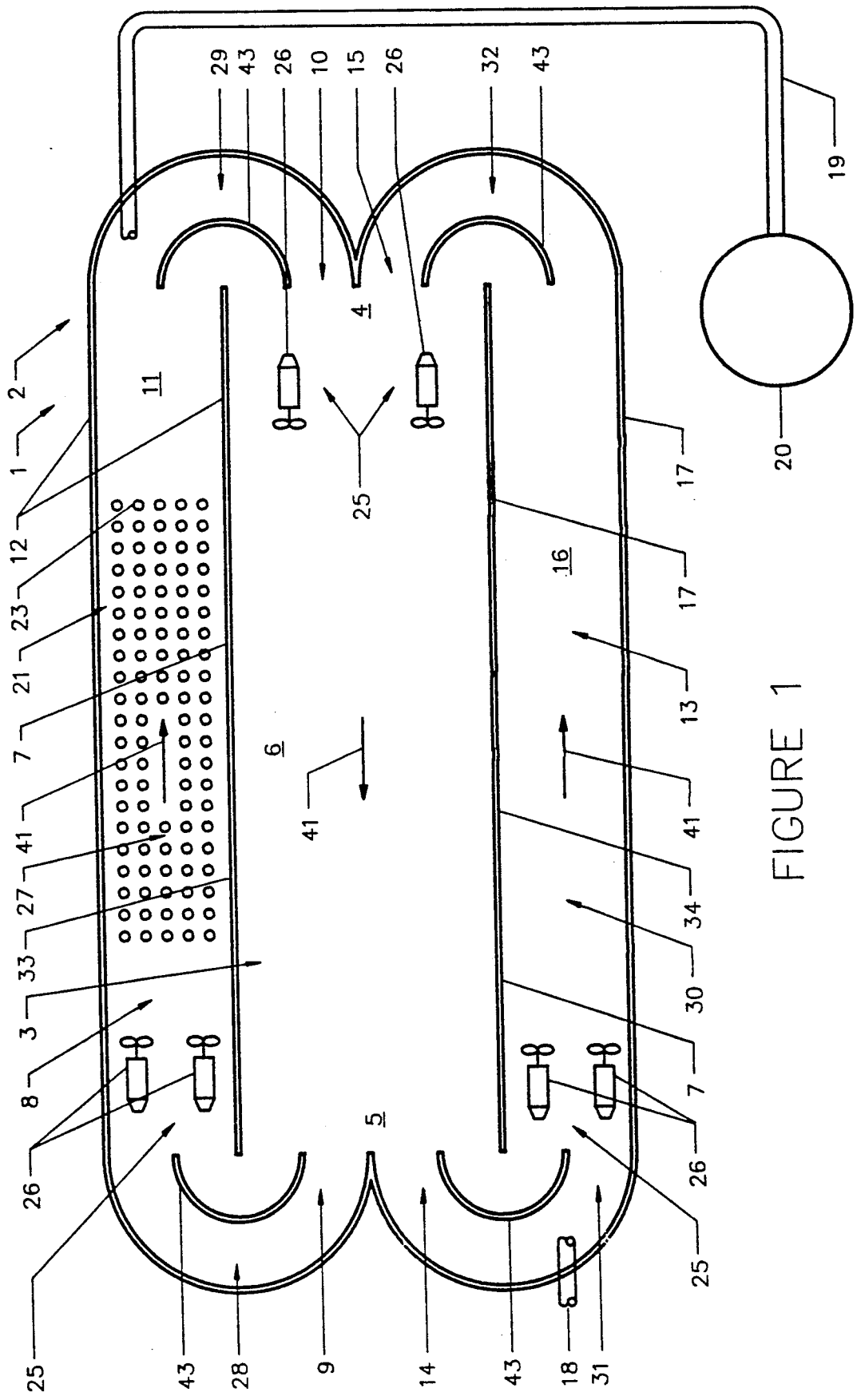
FIG. 1 is a plan view of an embodiment of the invention connected to an external clarifier and utilizing diffusors for aeration and submerged propeller mixers for circulation.
Figure 2:
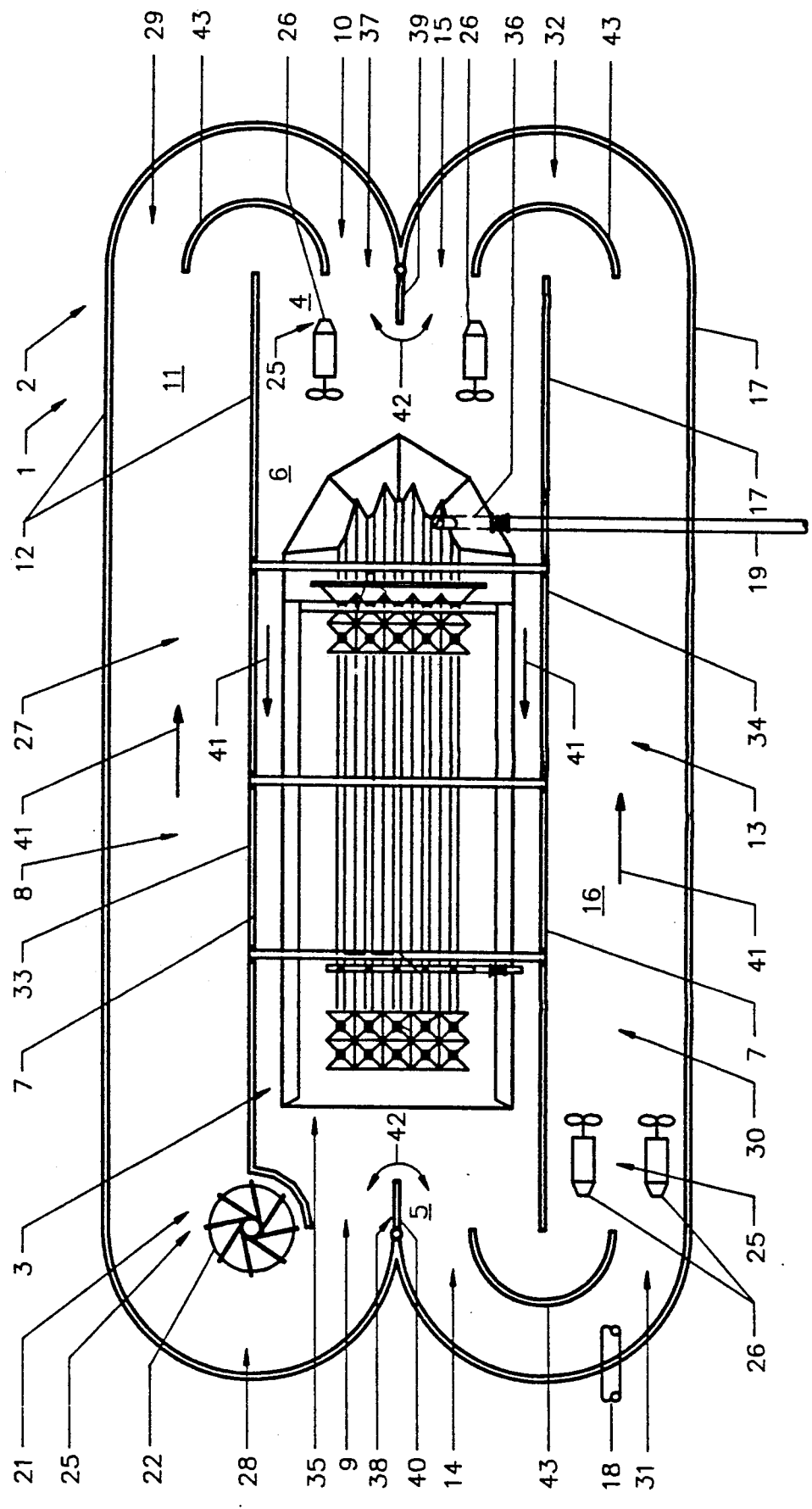
FIG. 2 is a plan view of an embodiment of the invention utilizing an intrachannel clarifier, a vertical turbine for aeration and circulation, and submerged propeller mixers for circulation.
Figure 3:
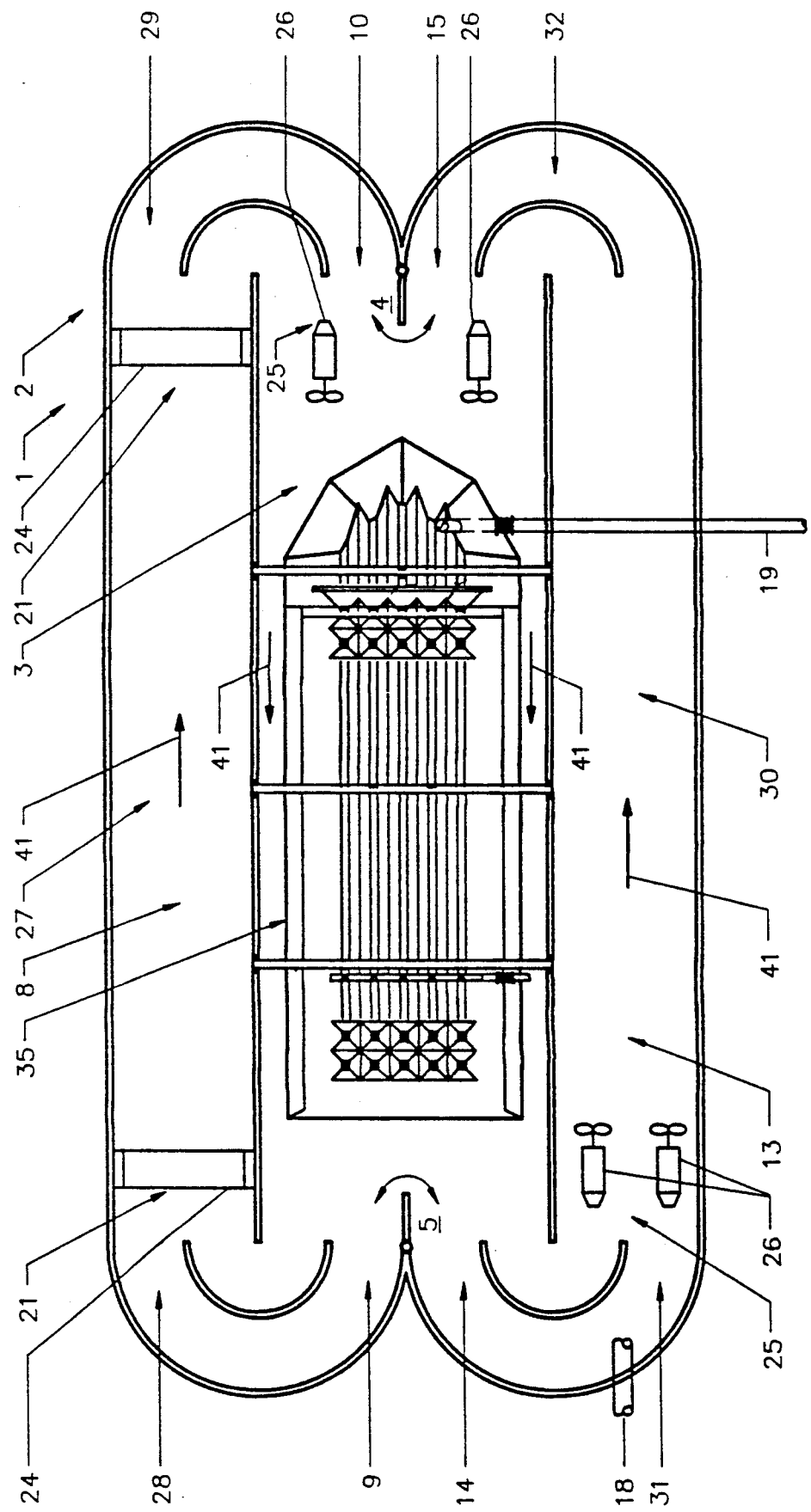
FIG. 3 is a plan view of an embodiment of the invention utilizing an intrachannel clarifier, brush rotors for aeration and circulation, and submerged propeller mixers for circulation.
Figure 4:
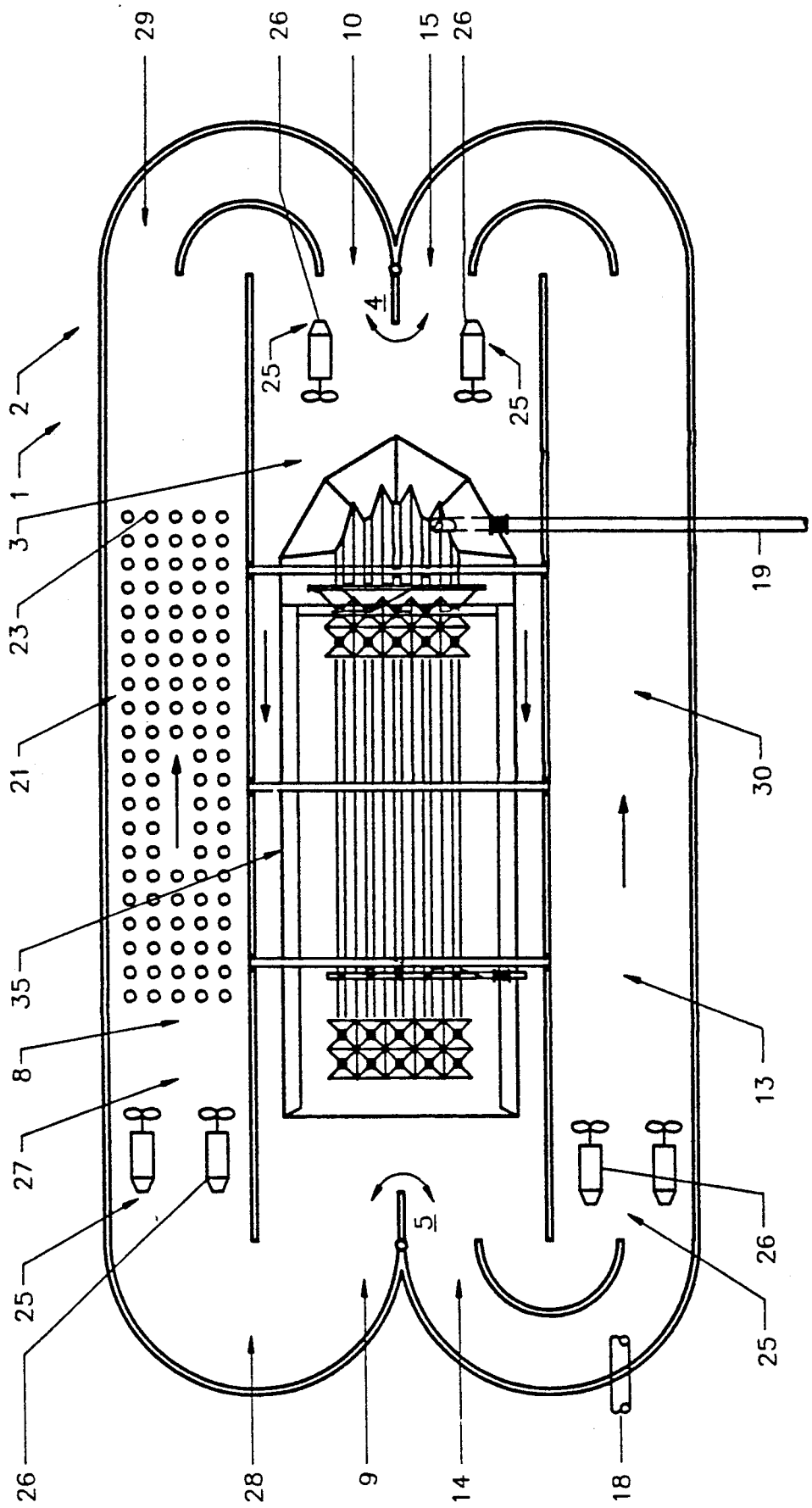
FIG. 4 is a plan view of an embodiment of the invention utilizing an intrachannel clarifier, diffusors for aeration and submerged propeller mixers for circulation.

As shown in the Figures, the system 1 comprises an oxidation ditch 2 including a central channel 3, an aeration channel 8 and a means for denitrifying wastewater embodied in a denitrification channel 13. Central channel 3 includes an inlet end 4, an outlet end 5, a bottom 6 and sidewalls 7. Aeration channel 8 includes an inlet end 9, an outlet end 10, a bottom 11 and sidewalls 12. Similarly, denitrification channel 13 includes an inlet end 14, an outlet end 15, a bottom 16 and sidewalls 17. Inlet end 9 of aeration channel 8 is fluidly connected to outlet end 5 of central channel 3, and outlet end 10 of aeration channel 8 is fluidly connected to inlet end 4 of central channel 3. similarly, inlet end 14 of denitrification channel 13 is fluidly connected to outlet end 5 of central channel 3, and outlet end 15 of denitrification channel 13 is fluidly connected to inlet end 4 of central channel 3. As shown in the figures, aeration channel outlet end 10, denitrification channel outlet end 15 and central channel inlet end 4 are fluidly connected such that the entire flow from aeration channel 8 and the entire flow from denitrification channel 13 enter central channel 3. Wastewater enters the system 1 through wastewater inlet 18, preferably located near inlet end 14 of denitrification channel 13, and exits the system through system outlet 19, the location of which may vary according to the clarification device utilized. FIG. 1 depicts the system 1 in combination with an external clarifier 20, and FIGS. 2-4 depict the system 1 in combination with an intrachannel clarifier 35.

Aeration is provided by a means 21 for aerating wastewater, positioned in aeration channel 8. Means 21 may comprise any aeration device known in the art or developed in the future, such as air diffusors 23 (see FIGS. 1 and 4), a vertical turbine 22 (see FIG. 2) and/or brush rotors 24 (see FIG. 3). Circulation of the wastewater in the system 1 is provided by means 25 for circulating wastewater, positioned in oxidation ditch 2. Means 25 may comprise any aeration device known in the art or developed in the future, such as submerged propeller mixers 26 (see FIGS. 1-4), vertical turbine 22 (see FIG. 2) and/or brush rotors 24 (see FIG. 3). It should be noted that some devices serve both as a means 21 for aerating wastewater and as a means 25 for circulating wastewater, such as vertical turbine 22 and brush rotors 24. Preferably, additional means 25, such as submerged mixers 26, should be strategically located throughout oxidation ditch 2, as shown, to assure adequate liquid velocity in accordance with the standards of the art. Means 25 are adapted to circulate wastewater from inlet end 4 of central channel 3 to outlet end 5 of central channel 3, from inlet end 9 to outlet end 10 of aeration channel 4, and from inlet end 14 to outlet end 15 of denitrification channel 13, as shown by flow arrows 41.

Preferably, the system 1 is organized in a compact form around a straight central channel 3, as shown in the Figures. Aeration channel 8 includes a substantially straight portion 27, a curved inlet portion 28, and a curved outlet portion 29. Inlet portion 28 connects straight portion 27 with outlet end 5 of central channel 3, and outlet portion 29 connects straight portion 27 with inlet end 4 of central channel 3. Similarly, denitrification channel 13 includes a substantially straight portion 30, a curved inlet portion 31, and a curved outlet portion 32. Inlet portion 31 connects straight portion 30 with outlet end 5 of central channel 3, and outlet portion 32 connects straight portion 30 with inlet end 4 of central channel 3. It is also preferable that aeration channel 8 is longitudinally separated from central channel 3 by a first partition wall 33, and that denitrification channel 13 is longitudinally separated from central channel 3 by a second partition wall 34. Turning vanes 43, known in the art, may be used to facilitate flow in curved portions 28, 29, 31 and 32.

This preferred system configuration allows the system 1 to occupy substantially the same area as a conventional orbital oxidation ditch. Instead of an oxidation ditch having a constant cross-sectional area equal to that of central channel 3, the system 1 may employ aeration channel 8 and denitrification channel 13, each having a constant cross-sectional area of one-half that of central channel 13, thus occupying the same overall area of the conventional oxidation ditch. The wide central channel 3 allows for an intrachannel clarifier 35 of the same size as that for a conventional oxidation ditch to be positioned in central channel 3, as shown in FIGS. 2-4. Intrachannel clarifier 35 discharges through clarifier outlet 36 into system outlet 19.

In order to provide versatility in adjusting flow dynamics, a first means 37 for directing flow, such as first adjustable vane 39 may be positioned in inlet end 4 of central channel 3, and a second means 38 for directing flow, such as second adjustable vane 40, may be positioned in outlet end 5 of central channel 3. Vanes 39,40 preferably extend the full depth of the mixed liquor in the ditch 2, and are pivotally adjustable, as indicated by adjustment arrows 42.

The system 1 creates a much larger anoxic zone than a conventional oxidation ditch, and yet allows for the activated sludge process to function as in a conventional system. The system 1 should provide ample denitrification capacity to treat normal domestic wastewater. In designing the system 1, system capacity should be calculated based on normal design parameters for a conventional orbital oxidation ditch. For example, in the preferred embodiment, if the desired treatment plant must treat one million gallons per day of wastewater, the total volume of the oxidation ditch 2 should be the same as that of a conventional one million gallon per day oxidation ditch. Central channel 3 would have the same width (between sidewalls 7) as the channel of a conventional ditch, and aeration channel 5 and denitrification channel 13 would each have a width (between sidewalls 12 and 17, respectively) of one-half that of central channel 3.

Other embodiments of the invention will occur to those skilled in the art, and are intended to be included within the scope and spirit of the following claims.

I claim:

1. An oxidation ditch wastewater treatment and denitrification system, comprising:
   a. an oxidation ditch, including:
      i. a central channel, having an inlet end, an outlet end, a bottom and two sidewalls, said central channel having no means for aerating wastewater positioned therein;
      ii. an aeration channel, having an inlet end fluidly connected to said outlet end of said central channel, an outlet end fluidly connected to said inlet end of said central channel, a bottom and two sidewalls; and
      iii. a means for denitrifying wastewater, including a denitrification channel, having an inlet end fluidly connected to said outlet end of said central channel, an outlet end fluidly connected to said inlet end of said central channel, a bottom and two sidewalls said denitrification channel having no means for aerating wastewater positioned therein;
      iv. wherein said aeration channel outlet end, said denitrification channel outlet end and said central channel inlet end are fluidly connected such that the entire flow from said aeration channel and the entire flow from said denitrification channel enter said central channel;
   b. a means for aerating wastewater, positioned in said aeration channel;
   c. a means for circulating wastewater, positioned in said oxidation ditch and adapted to circulate wastewater from said inlet end of said central channel to said outlet end of said central channel, from said inlet end of said aeration channel to said outlet end of said aeration channel, and from said inlet end of said denitrification channel to said outlet end of said denitrification channel;

d. a wastewater inlet, fluidly connected to said oxidation ditch; and e. a system outlet, fluidly connected to said oxidation ditch.

2. An oxidation ditch wastewater treatment and denitrification system according to claim 1, wherein:

i. said central channel is substantially straight;

ii. said aeration channel is provided with substantially straight portion, a curved inlet portion connecting said straight portion of said aeration channel and said outlet end of said central channel, and a curved outlet portion connecting said straight portion of said aeration channel and said inlet end of said central channel; and iii. said denitrification channel is provided with substantially straight portion, a curved inlet portion connecting said straight portion of said denitrification channel and said outlet end of said central channel, and a curved outlet portion connecting said straight portion of said denitrification channel and said inlet end of said central channel.

3. An oxidation ditch wastewater treatment and denitrification system according to claim 2, wherein said aeration channel is longitudinally separated from said central channel by a first partition wall, and wherein said denitrification channel is longitudinally separated from said central channel by a second partition wall.

4. An oxidation ditch wastewater treatment and denitrification system according to claim 1, wherein said aeration channel and said denitrification channels each have a substantially constant first cross-sectional area, and wherein said central channel has a substantially constant cross-sectional area of twice said first cross-sectional area.

5. An oxidation ditch wastewater treatment and denitrification system according to claim 1, wherein an intrachannel clarifier is positioned in said central channel.

6. An oxidation ditch wastewater treatment and denitrification system according to claim 1, wherein a means for directing f low is positioned in said inlet end of said central channel.

7. An oxidation ditch wastewater treatment and denitrification system according to claim 6, wherein said means for directing flow includes an adjustable vane.

8. An oxidation ditch wastewater treatment and denitrification system according to claim 1, wherein a means for directing flow is positioned in said outlet end of said central channel.

9. An oxidation ditch wastewater treatment and denitrification system according to claim 8, wherein said means for directing flow includes an adjustable vane.

10. An oxidation ditch wastewater treatment and denitrification system according to claim 1, wherein a first means for directing flow is positioned in said inlet end of said central channel, and wherein a second means for directing flow is positioned in said outlet end of said central channel.

11. An oxidation ditch wastewater treatment and denitrification system according to claim 10, wherein said first means for directing flow includes a first adjustable vane and wherein said second means for directing flow includes a second adjustable vane.

* * * * *